No. 784,362. PATENTED MAR. 7, 1905.
V. C. TASKER.
RECOIL OPERATED GUN.
APPLICATION FILED FEB. 12, 1904.
7 SHEETS—SHEET 2.
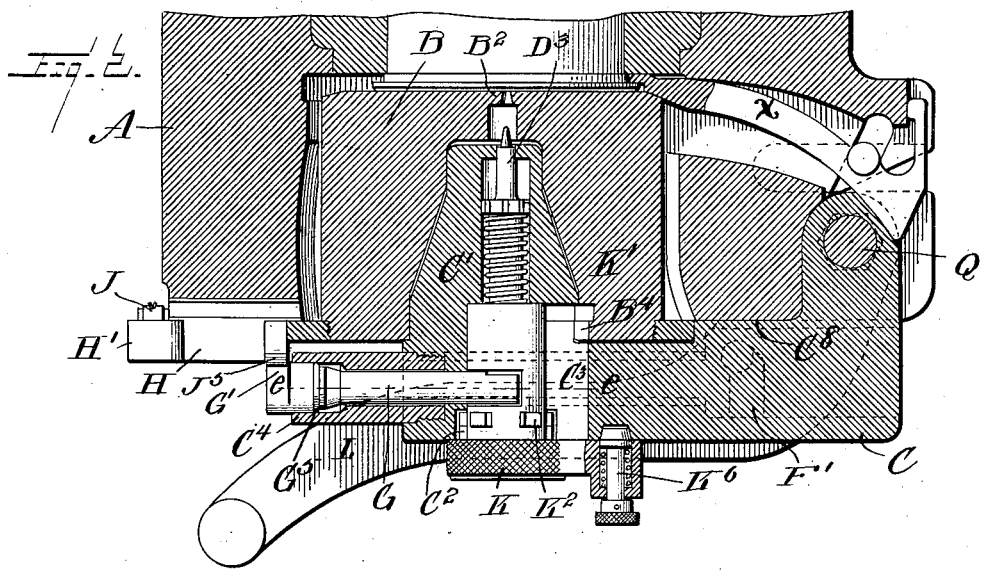
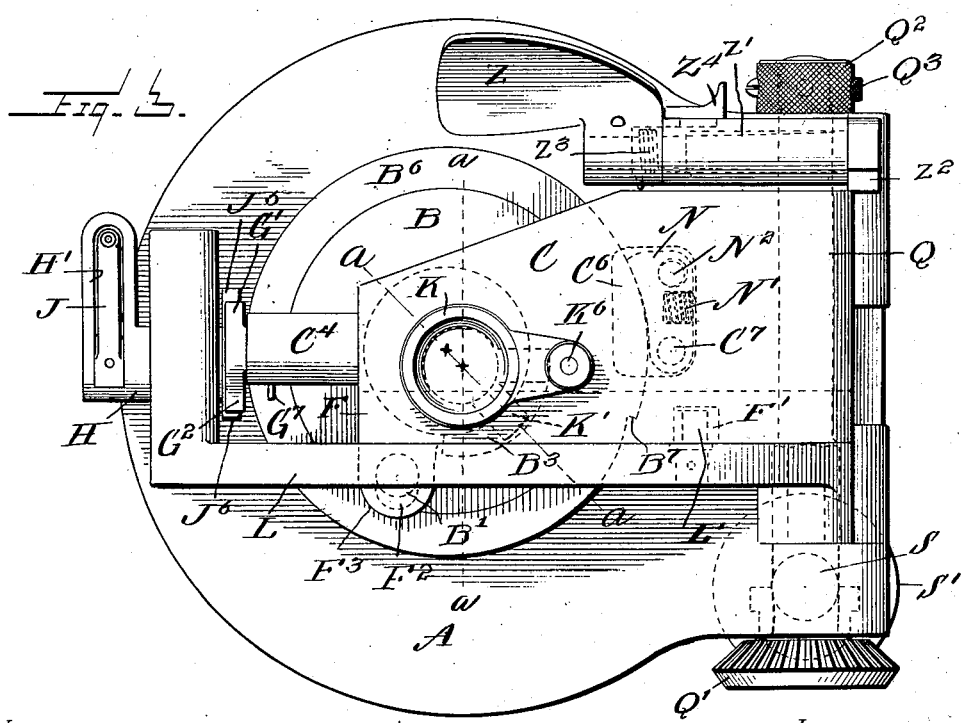
WITNESSES
Wm. F. Doyle.
A. Y. Leech Jr.
INVENTOR
Vernon C. Tasker
BY
Henry T. Bright
Attorney No. 784,362. PATENTED MAR. 7, 1905.
V. C. TASKER.
RECOIL OPERATED GUN.
APPLICATION FILED FEB. 12, 1904.
7 SHEETS—SHEET 3.
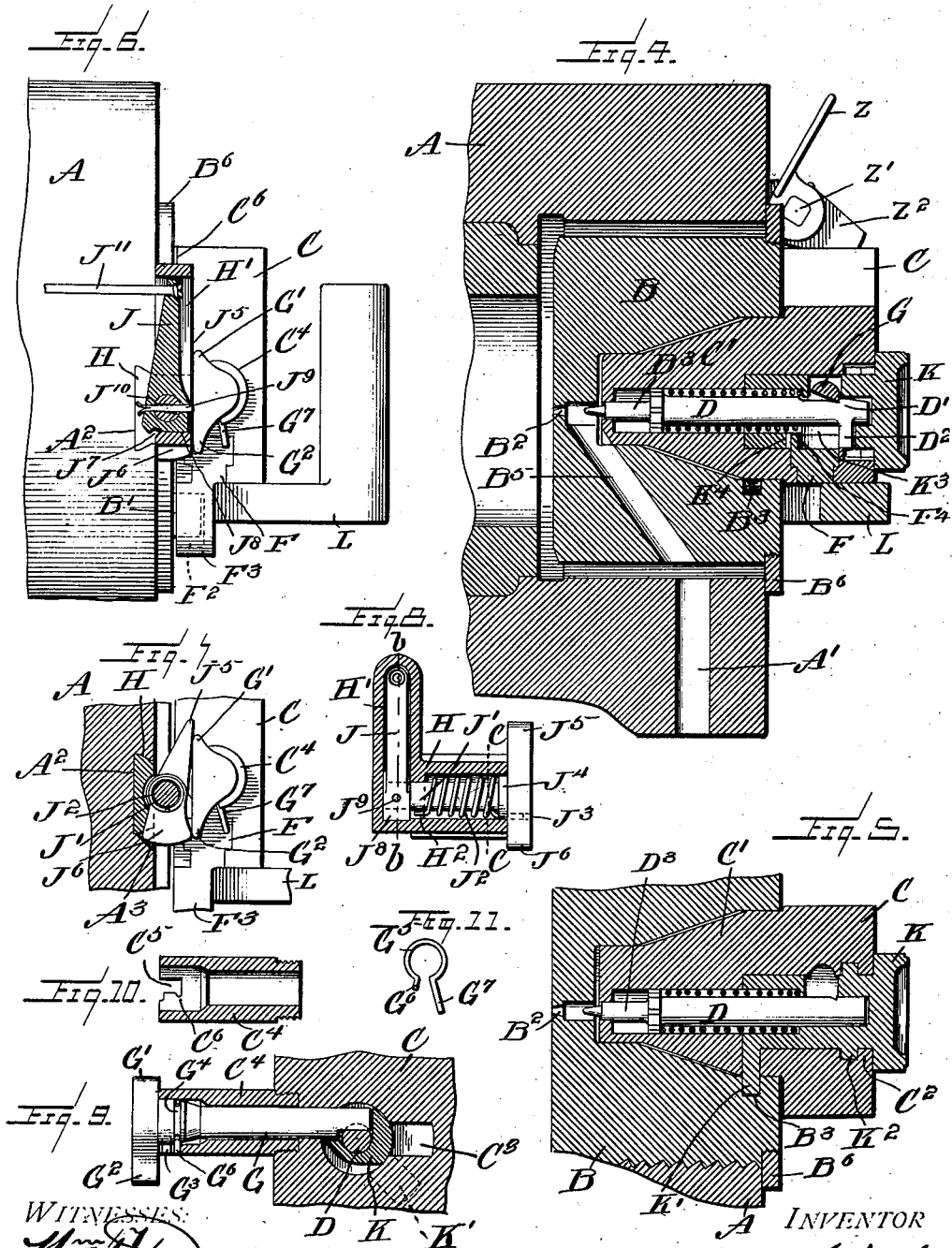
WITNESSES:
INVENTOR
BY
Attorney No. 784,362. PATENTED MAR. 7, 1905.
V. C. TASKER.
RECOIL OPERATED GUN.
APPLICATION FILED FEB. 12, 1904.
7 SHEETS—SHEET 4.
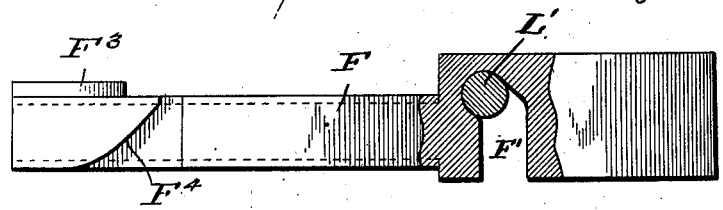
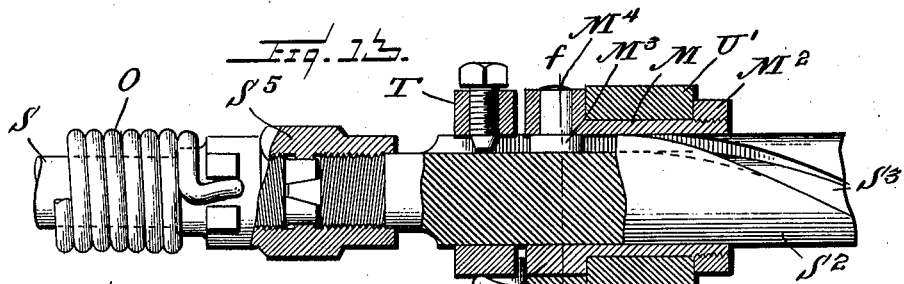
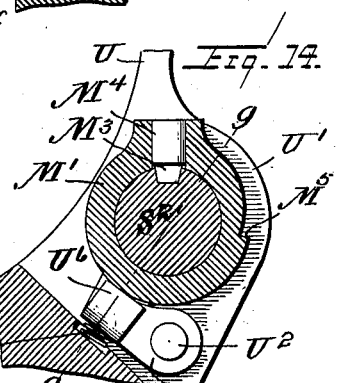
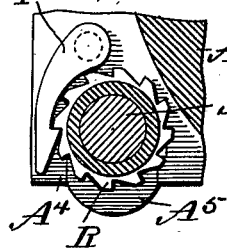
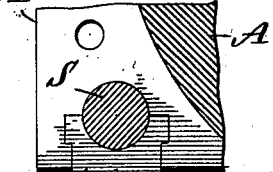
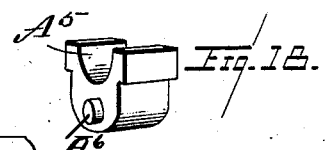
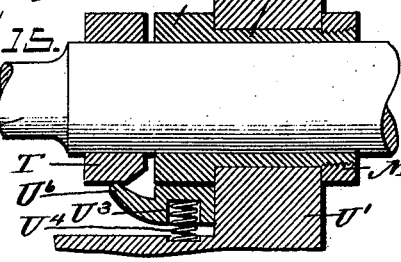
WITNESSES:
INVENTOR
Vernon C. Tasker
By Henry T. Bright
Attorney

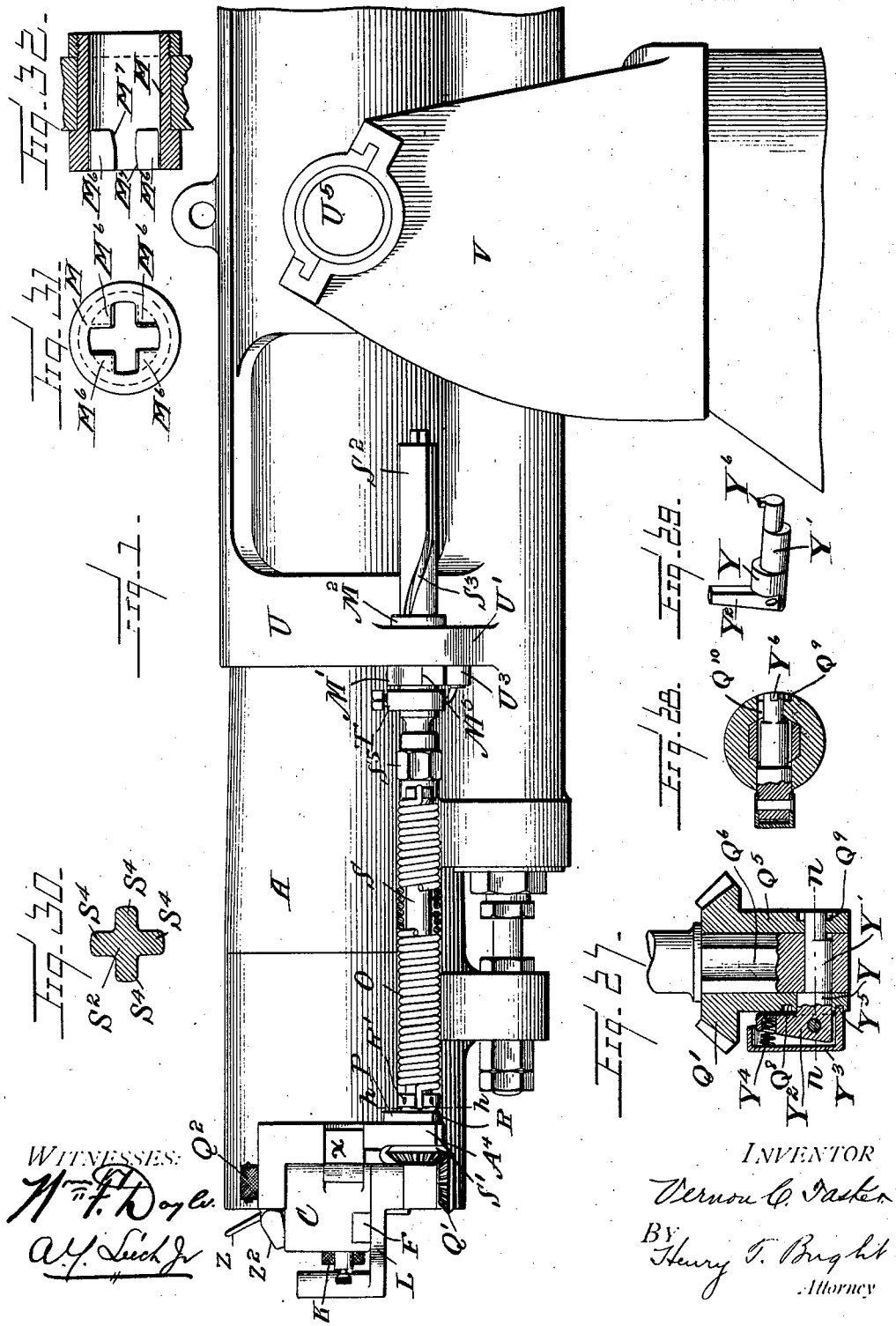

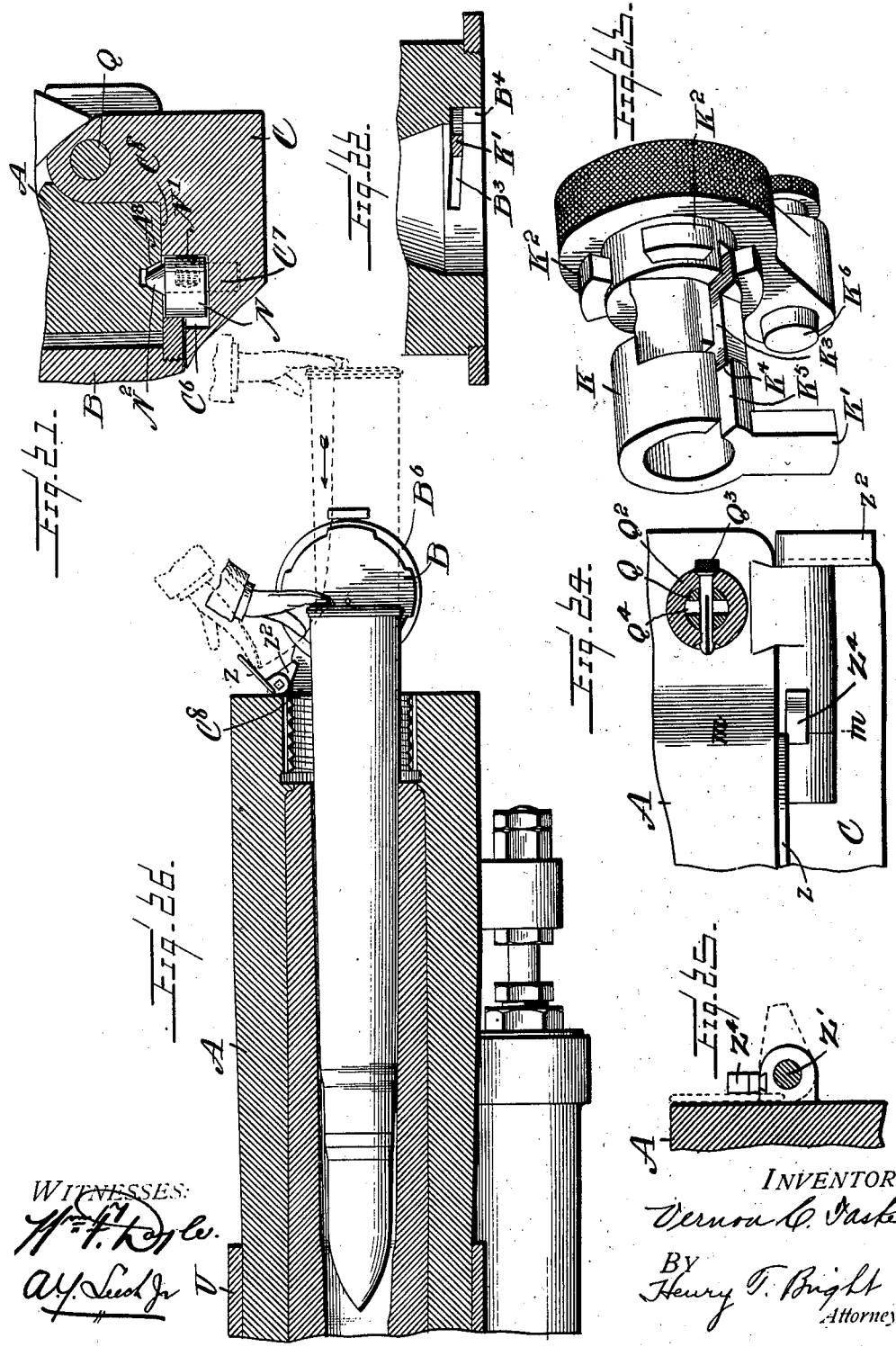

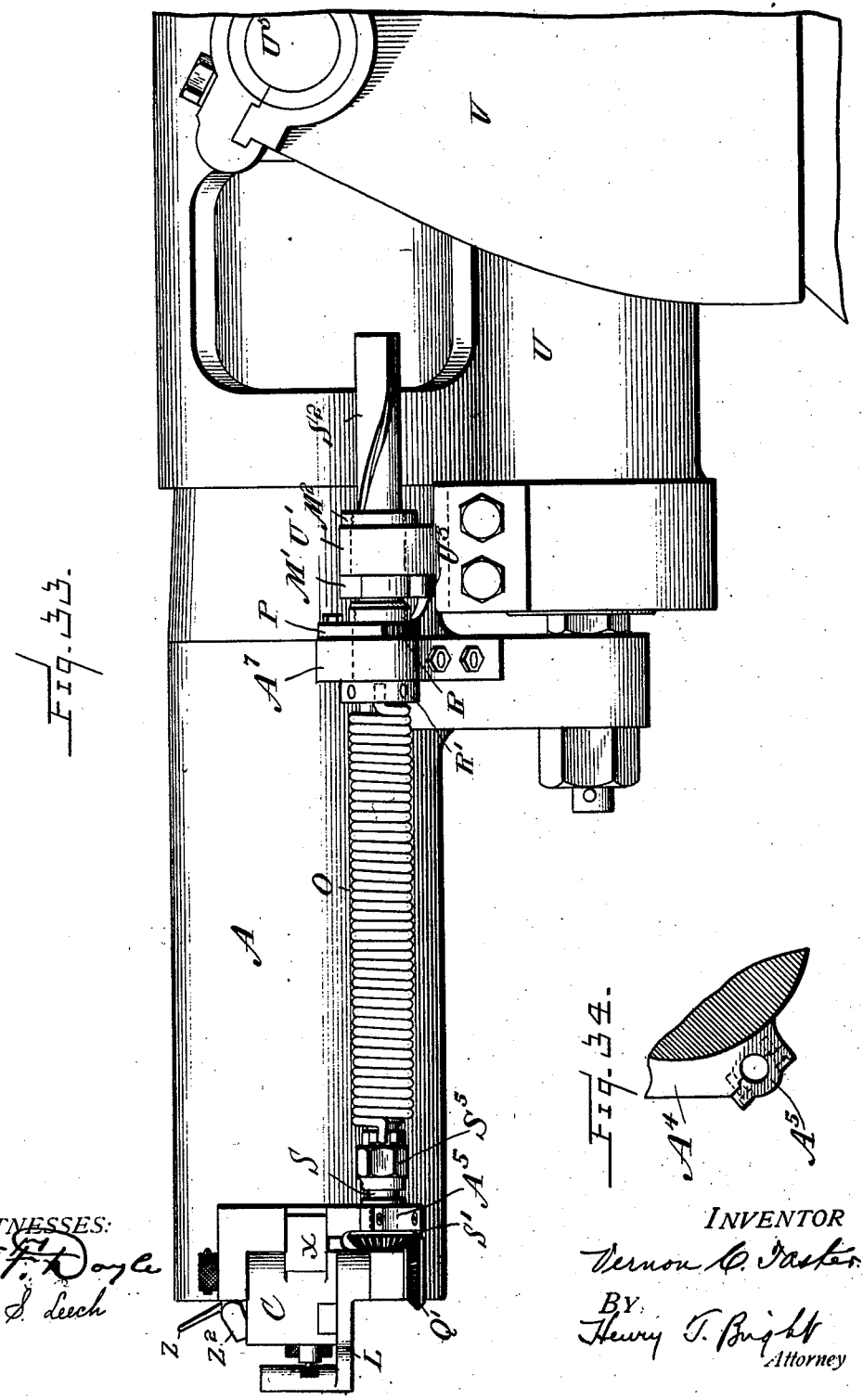

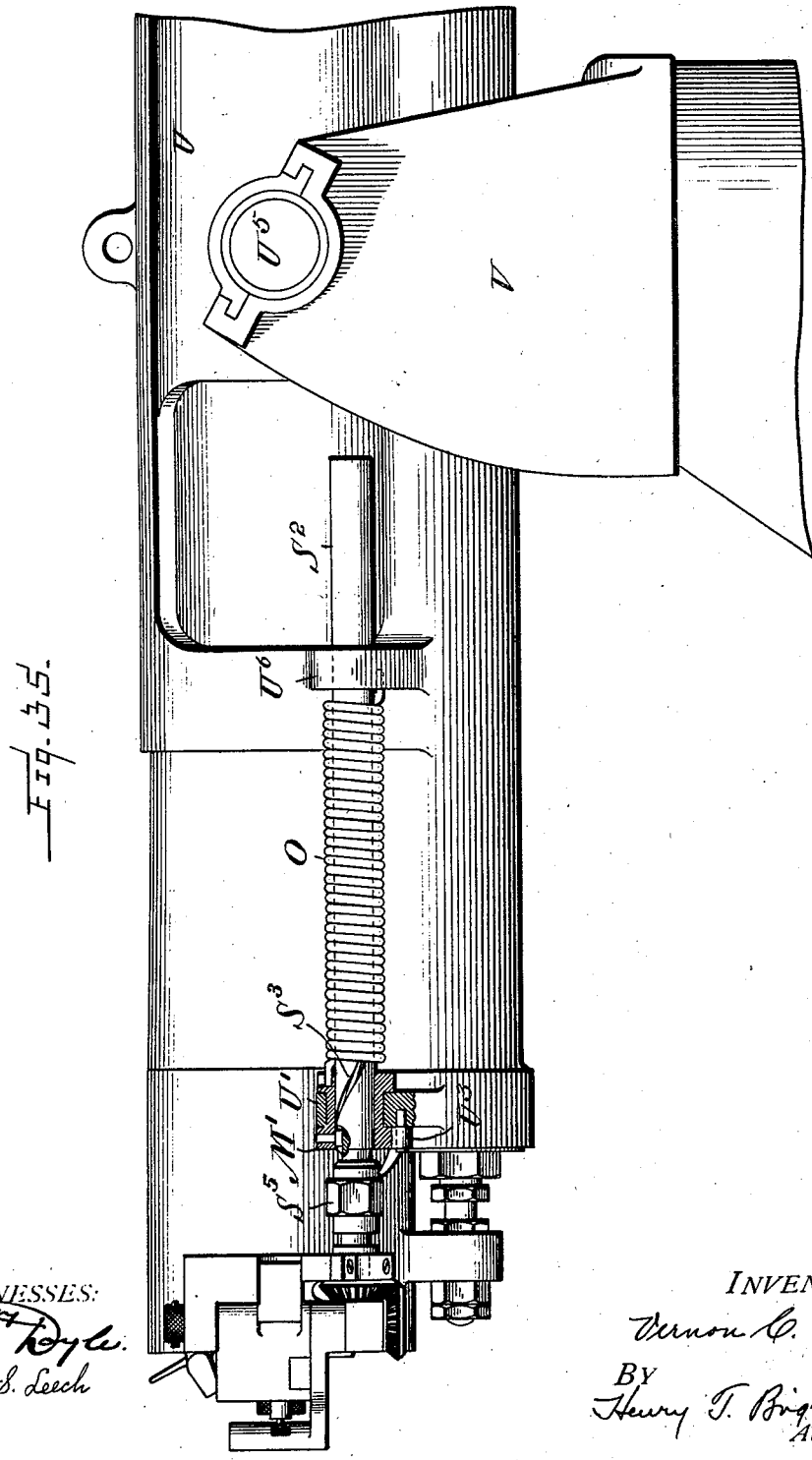

No. 784,362.

Patented March 7, 1905.

UNITED STATES PATENT OFFICE.

VERNON C. TASKER, OF WASHINGTON, DISTRICT OF COLUMBIA, ASSIGNOR TO UNITED STATES ORDNANCE COMPANY, OF WASHINGTON, DISTRICT OF COLUMBIA, A CORPORATION OF VIRGINIA.

RECOIL-OPERATED GUN.

SPECIFICATION forming part of Letters Patent No. 784,362, dated March 7, 1905.

Application filed February 12, 1904. Serial No. 193,238.

*To all whom it may concern:*

Be it known that I, VERNON C. TASKER, a citizen of the United States, residing at Washington, in the District of Columbia, have invented certain new and useful Improvements in Recoil-Operated Guns, of which the following is a full, clear, and exact description when taken in connection with the accompanying drawings, which form a part thereof, and in which—

Figure 1 is a right-side elevation of a gun and mount equipped with my invention; Fig. 2, a horizontal section of the breech mechanism; Fig. 3, a rear elevation of the breech of the gun; Fig. 4, a vertical section of the breech mechanism; Fig. 5, a section on the line $a\,a$ of Fig. 3; Fig. 6, a partial left-side elevation of the breech, the trigger being in section on the line $b\,b$ of Fig. 8; Fig. 7, a similar view, the section being on the line $c\,c$ of Fig. 8; Fig. 8, a vertical section through the trigger-box; Fig. 9, a vertical section on the line $e\,e$ of Fig. 2; Fig. 10, a horizontal section of the bearing-sleeve for the sear, showing slot for retaining device; Fig. 11, a detail view of the retaining device for the sear; Fig. 12, a plan view, partly broken away, of the operating-bar of the breech mechanism; Fig. 13, a right-side elevation of the semi-automatic actuating-rod, partly in section, showing its engagement with the mount; Fig. 14, a cross-section on the line $f\,f$ of Fig. 13; Fig. 15, a section on the line $g\,g$ of Fig. 14; Fig. 16, a section on the line $h\,h$ of Fig. 1 looking rearwardly; Fig. 17, a similar view, the ratchet-wheel and pawl being removed; Fig. 18, a perspective view of the removable bearing in the gun for the semi-automatic actuating-rod; Fig. 19, a vertical section through the bevel-gear $S'$ on the semi-automatic actuating-rod; Fig. 20, a front elevation of the bevel-gear $S'$; Fig. 21, a horizontal section of a portion of the hinged carrier, showing the engagement of the block-latch with the gun; Fig. 22, a sectional plan of the breech-block, showing the guide-groove $B^3$ in its bore; Fig. 23, a perspective view of the firing-case; Fig. 24, a plan view of the tripping device for the breech mechanism locked in inoperative position and showing the operating-shaft nut $Q^2$ in section; Fig. 25, a section on the line $m\,m$ of Fig. 24; Fig. 26, a vertical section of the gun viewed from the left, illustrating the method of loading and tripping; Fig. 27, a vertical section of the bevel gear $Q'$ modified to permit its disengagement at will from the semi-automatic actuating-rod; Fig. 28, a section on the line $n\,n$ of Fig. 27; Fig. 29, a perspective view of the eccentric shaft Y; Fig. 30, a cross-section of the semi-automatic actuating-rod in modified form; Figs. 31 and 32, end and sectional views, respectively, of a corresponding modification of the bushing M; Fig. 33, a view similar to Fig. 1, showing a forward bearing on the gun to support the semi-automatic apparatus; Fig. 34, a view similar to Fig. 17, showing a modified form of the removable bearing $A^5$; Fig. 35, a view similar to Fig. 1, showing the semi-automatic apparatus supported both front and rear by bearings on the mount.

My invention relates to recoil-operated breech mechanism for guns, and comprises improved means for utilizing motion of the gun due to recoil for the purpose of operating the breech mechanism, together with certain novel details hereinafter more fully described and claimed.

The cartridge-case extractor X shown herein is covered by my United States Letters Patent No. 599,482, issued February 22, 1898, and the eccentric breech system employed is covered by United States Letters Patent No. 751,761, issued February 9, 1904.

Referring to the drawings, A represents a gun equipped with my invention mounted to recoil in the rocking slide U, whose trunnions $U^5$ have bearings in the top carriage V of the mount.

B is the breech-block, supported by a swinging carrier C, hinged to the gun by an operating-shaft Q. An operating-lever L is non-rotatively engaged by the operating-shaft Q and operates the breech mechanism, either by hand or automatically, by motion imparted to the operating-shaft by the semi-automatic gear. For this purpose a transversely-sliding operating-bar F is mounted in the carrier adjacent to the operating-lever L and has a slot F' engaged by a stud L' on the operating-lever, whereby the swinging of the lever causes a sliding of the bar. A slot $F^2$ in the front face of a lug $F^3$ on the bar engages a stud B' in the rear face of the breech-block, whereby sliding of the bar causes rotation of the breech-block.

The forward portion of the slot F' is curved about the center of the operating-shaft Q (see Fig. 12) and permits the stud L' to move freely a short distance after the breech is closed, which locks the breech-block in its closed position by preventing the transmission of motion from the latter to the operating-lever.

The breech-block B is revolubly mounted on a hub C' on the carrier. This hub is eccentric to the bore of the gun, as is the breech-block cavity in the gun, while the firing-pin is supported centrally to the bore of the gun, and the firing-pin aperture $B^2$ in the breech-block is in line with the firing-pin and primer only when the block B is completely locked, as set forth in my United States Patent No. 751,761 aforementioned.

The breech-block is normally secured and guided on the hub C' by the engagement of a groove $B^3$ in the block with a lug K' on the firing-case K. This groove (see Fig. 22) is partly helical to accommodate the movement of the breech-block and partly straight to permit removal of the lug K' through the channel $B^4$.

The firing-case K is mounted in the carrier C and adapted to be removed by a partial rotation and withdrawal to the rear. This partial rotation liberates the securing-lugs $K^2$ from similar lugs $C^2$, formed in the carrier, and brings the lug K' opposite the channel $B^4$ in the breech-block opening rearwardly from the groove $B^3$ and in line with a longitudinal passage $C^3$ in the carrier, through which the lug K' passes when the firing-case is withdrawn.

To remove the firing-case K, it is necessary to first partially remove the sear G from its seat in the carrier. The sear is a rotatable shaft lying transversely to the firing-pin D, (see Fig. 4,) its inner end flattened and normally engaging a notch D' in the latter. It is released from this notch when rotated by the trigger, as will be more fully described hereinafter.

The firing-pin D has a lug $D^2$, guided in a longitudinal slot $K^3$ through the firing-case and adapted to be engaged by a cocking-cam $F^4$ on the operating-bar F, (see Fig. 4,) whereby the firing-pin is retracted by motion of the bar in opening the breech. The slot $K^3$ terminates forwardly in a shoulder $K^4$ and communicates with another slot, $K^5$, (see Fig. 23,) through which the lug $D^2$ can pass when dismounting the parts. The shoulder $K^4$ causes the removal of the firing-case to withdraw also the firing-pin and spring. The forward end $D^3$ of the firing-pin is reduced in area, as is its aperture in the carrier, in order to expose less surface to the destructive action of a possible "blow-back" of the powder-gases. To further minimize the effect of such accident, a vent $B^5$ is provided in the breech-block, (see Fig. 4,) communicating with a similar vent A' in the gun passing to the atmosphere. A sleeve $C^4$, projecting from the carrier, forms a bearing for the outer end of the sear G, which terminates in the two actuating-arms G' and $G^2$. Rotation of the sear is limited by a stop $G^3$ meeting the walls of a slot $C^5$ in the sleeve, Figs. 9 and 10. The sear is retained in its place by an annular detent-spring $G^5$, (shown separately in Fig. 11,) lying in a circumferential groove $G^4$. The bent ends $G^6$ $G^7$ of the spring tend to separate, and one of them, $G^7$, rests in a notch $C^6$ in the slot $C^5$ and is prolonged for convenience of handling, the other end, $G^6$, reacting against the opposite wall of the slot. To remove the sear, the prolonged end $G^7$ of the detent is pressed forwardly to liberate it from the notch $C^6$, which permits the sear to be withdrawn, Figs. 9, 10, and 11.

The trigger-box H fits a dovetail slot $A^2$ in the rear face of the gun, has a vertical guard H' for the trigger J, and is perforated horizontally for the trigger-shaft J' and its spring $J^2$. (See Figs. 7 and 8.) The latter tends to rotate the shaft, engaging it at $J^3$ and the trigger-box at $H^2$. The inner end $J^4$ of the trigger-shaft has arms $J^5$ and $J^6$, adapted to engage the arms on the sear. The trigger has stop-surfaces $J^7$ and $J^8$, Fig. 6, limiting its motion. It is secured on the shaft by a pin $J^9$, the hole $J^{10}$ for the same in the shaft (see Fig. 6) being slightly elongated to permit somewhat greater movement of the shaft J' than can be imparted by the trigger. This additional movement can be imparted by pressing the upper arm $J^5$ (see Fig. 7) and causes the lower arm $J^6$ (which normally lies in a recess $A^3$ in the gun and secures the trigger-box therein) to swing clear of the gun.

The upper end of the trigger is equipped with a lanyard $J^{11}$, Fig. 6, and when pulled forwardly causes the shaft J' to rotate against the resistance of its spring $J^2$ and the arm $J^6$ to act rearwardly upon the arm $G^2$ of the sear, rotating the latter and releasing the firing-pin D, which fires the gun. No separate spring is provided for the sear. When the breech is open, no engagement of the sear is necessary, the firing-pin being held cocked by the cocking-cam. When the breech is closed, engagement of the sear with the pin is insured by the contact of its upper arm G' with the upper arm $J^5$ of the trigger-shaft. When the pin is being cocked, it deflects the sear against the resistance of the trigger-spring. Motion thus imparted from sear to trigger-shaft through their upper arms or from trigger-shaft to sear through their lower arms can cause no interference, since the opposite ends in each case recede from each other, owing to the difference of height of the respective centers of motion.

A flange $B^6$, Fig. 3, on the breech-block closes all rearward apertures of the breech. It is made separately only to facilitate the threading of the breech-block in manufacture.

A locking-plunger $K^6$ secures the firing-case K against accidental rotation. (See Figs. 2 and 3.)

The breech-block is locked against rotation when out of the gun by a latch N, lying in a recess $C^6$ in the front face of the carrier. It pivots on a stud $C^7$ and is actuated by a spring $N'$ to engage the notch $B^7$, Fig. 3, in the flange of the block when the latter is unlocked. On the front face of the latch is a conical projection $N^2$, which engages a recess $A^8$ in the gun when the breech is closed and withdraws the latch. (See Fig. 21.)

Above the carrier is a horizontal shaft $Z'$, journaled in a bearing secured to the gun, having a toe $Z^2$ normally resting downwardly on the carrier and at its other extremity a tripping-vane Z, adapted to be operated by the hand of the loader. A spring $Z^3$ causes the arm $Z^2$ to swing in front of the face $C^8$ on the carrier when the latter is almost fully open to prevent the breech from closing automatically except at the will of the loader. A sliding stop $Z^4$ is adapted to lock the tripping-vane in inoperative position when it is desired to operate the breech mechanism by hand. (See Figs. 2, 3, 24, 25, and 26.)

The operating-shaft Q has at its lower end a bevel-gear $Q'$ and is secured in the gun by a nut $Q^2$, screwed on its upper end and locked by an elastic split pin $Q^3$, which pierces it transversely and can engage either of the transverse holes $Q^4$ in the shaft in either direction to secure the requisite adjustment. (See Fig. 3.)

The semi-automatic actuating-rod S (see Fig. 1) is journaled in the gun at $A^4$, the lower part $A^5$ of its bearing being removable, as shown in Figs. 17 and 18, for convenience of assembling. It carries the bevel-gear $S'$, meshing with that on the operating-shaft, and recoils with the gun. Its forward end is guided by a bushing M, mounted to freely revolve in a bearing-lug $U'$ on the rocking slide. This bushing has a rearward collar $M'$ and a forward retaining-nut $M^2$. The semi-automatic actuating-rod is preferably made in two parts, the forward extension $S^2$ being somewhat larger in diameter and provided with one or more cam-grooves $S^3$. The parts may be joined in the manner indicated in Fig. 13, where a wedge-like engagement is produced by rotation of a nut $S^5$, having right and left hand threads. Carried by the rod S is a helical spring O, adapted to act torsionally on the rod. Its forward end engages the coupling-nut $S^5$ thereon and insures its tightness, while its rear end is adjustably connected with the gun through the loosely-mounted ratchet-wheel R and a pawl P, pivoted in the gun. (See Fig. 16.) Formed on the ratchet-wheel is a capstan-head $R'$, Fig. 1, having holes by which with a suitable tool different teeth may be presented to the pawl P to get proper tension in the spring. A stop-groove $S^4$ in the front face of the gear $S'$ (see Fig. 20) engages a stop-pin $A^6$ in the bearing $A^5$ to limit rotation of this gear when not in mesh with the gear $Q'$.

The collar $M'$ of the revoluble bushing M carries a tappet $M^3$, engaging the cam-groove $S^3$ and free to swivel on its stem $M^4$. The collar $M'$ has a notch $M^5$ in its periphery. (See Fig. 14.) Pivoted on a stud $U^2$ on the lug $U'$ is a pawl $U^3$, pressed toward the periphery of the collar $M'$ by its spring $U^4$. An adjustable collar T on the shaft normally engages a lug $U^6$ on the pawl, holding the latter slightly away from the collar $M'$, as shown in Fig. 15.

The cam-surfaces for rotating the semi-automatic actuating-rod may be modified in various ways. One such modification is illustrated in Figs. 30, 31, and 32, where the rod $S^2$ is of star-like section, its ribs $S^4$ adapted to engage solid lugs $M^6$ in the bushing M. The swiveled tappet $M^3$ is dispensed with, and the twist of the ribs $S^4$ is accommodated by cutting away the lugs $M^6$ at $M^7$, as shown.

Assuming the gun is loaded and the breech closed, its operation is as follows: The lanyard $J^{11}$ is pulled, causing the sear G to release the firing-pin D and fire the gun. The gun recoils and with it moves the semi-automatic actuating-rod S, with its spring O, ratchet-wheel R, and tripping-collar T. The cam-groove $S^3$ causes the tappet $M^3$ to rotate the bushing M until the notch $M^5$ passes the pawl $U^3$, which snaps into the notch. After recoil the recuperator-springs of the mount cause the gun to return to its original position. As it does so, however, the rod S is unable to rotate the collar $M'$ in the reverse direction because of the pawl $U^3$ and is forced itself to rotate. This rotates the operating-shaft Q and opens the breech, the carrier swinging rapidly to its open position and actuating the extractor X, which ejects the empty cartridge-case. The final forward movement of the gun causes the collar T to trip the pawl $U^3$ and liberate the bushing M and rod S, when the spring O (the tension of which has been increased by the opening movement) would immediately close the breech but for the tripping-toe $Z^2$. The latter, engaging the carrier, holds the breech open until the gun is again loaded. The hand of the loader after giving a quick impulse to the charge moves naturally upward and strikes the vane Z, releasing the tripping-toe $Z^2$ from engagement with the carrier and permitting the spring O to rotate the rod S and close the breech mechanism, at which moment the hand of the loader is in a position free from danger of injury by the closing breech mechanism. This is illustrated in Fig. 26. The rod S may preferably be arranged to open the breech during the recoil of the gun instead of its reverse movement, especially where the recoil is very great. In such case the cam-groove $S^3$ is reversed in direction, as is the pawl $U^3$ and notch $M^5$.

Fig. 33 shows a somewhat different arrangement of the semi-automatic apparatus and a forward bearing $A^7$ on the gun, which serves to support the semi-automatic device when the gun is removed from its mount.

In another modification, Fig. 35, the semi-automatic apparatus is supported in bearings $U'$ and $U^6$ on the mount and is retained therein when the gun is dismounted, the coupling-nut $S^5$ having been first disconnected. Furthermore, in this arrangement the spring O is energized by the direct recoil of the gun and held thus by the pawl $U^3$, the breech being opened on counter-recoil, as in Figs. 1 and 33. The work of the recuperator-springs of the mount is thereby lessened.

In cases where it is desirable that the automatic opening and closing apparatus may be rendered inoperative at will and the breech mechanism operated by hand I provide the alternate construction of bevel-gear $Q'$ and operating-shaft Q illustrated in Figs. 27, 28, and 29. In this construction the gear $Q'$ has a downwardly-projecting hub $Q^5$ and is capable of limited vertical adjustment on the hexagonal prolongation $Q^6$ of the operating-shaft, whereby it may be moved into or out of engagement with the gear $S'$ and locked in either position. This adjustment is accomplished by a shaft Y, journaled in the hub, having an eccentric middle portion $Y'$ engaging a transverse slot in the hinge-pin. Pivoted to an arm $Y^2$ on the shaft is a spring-catch $Y^3$, enveloping the arm, its spring $Y^4$ lying in a socket in the arm and actuating the projection $Y^5$ to engage a recess in the gear-hub. To disengage the gear $Q'$, the upper end of the catch $Y^3$ is depressed and the shaft rotated a half-turn, when the projection $Y^5$ will snap into another recess $Q^8$ and lock the gear in inoperative position. The eccentric shaft is normally retained in the hub by a lug $Y^6$ on its smaller end, which engages a counterbored recess $Q^9$. A slot $Q^{10}$ permits withdrawal of the shaft in one position. Since it is important that when thus disengaged from the breech mechanism the rod S shall not be rotated and tripped by the movement of the gun, I provide that the disengagement of the gear $Q'$, as described, shall automatically prevent engagement of the forward pawl $U^3$ with the notch $M^5$ in the bushing M. To do this, it is only necessary to slightly extend the lower end of the stop-groove $S^4$ in the gear $S'$, which permits the spring O to rotate the rod and its cam-groove $S^3$ into a new position and one which will not cause the bushing M to revolve far enough for its notch $M^5$ to pass and engage the pawl $U^3$.

While I prefer to use a screw breech mechanism of the kind here described and shown, it is obvious that details of the latter may be changed to any extent, provided motion is still imparted through the hinge-pin, and that the essential features of my invention are applicable to any breech mechanism which is operated by rotation of a shaft.

Other arrangements of parts to suit various circumstances and conditions are possible by the exercise of ordinary mechanical skill without departing from the spirit of the invention.

I claim—

1. The combination with a breech-loading gun, a transverse operating-shaft for the breech mechanism, and a recoil-mount; of a longitudinal rotatable rod operatively engaging said shaft and means on the mount directly engaging said rod to rotate the same during movement of the gun to open the breech.

2. The combination with a breech-loading gun, a transverse operating-shaft for the breech mechanism, and a recoil-mount; of a longitudinal rotatable rod operatively engaging said shaft and means on the mount directly engaging said rod for automatically actuating the same to open the breech.

3. The combination with a breech-loading gun, a transverse operating-shaft for the breech mechanism, and a recoil-mount; of a longitudinal rotatable rod operatively engaging said shaft, means on the mount directly engaging said rod for automatically actuating the same to open the breech and means for automatically closing the breech.

4. The combination with a breech-loading gun, a transverse operating-shaft for the breech mechanism, and a recoil-mount; of a rotatable rod moving with the gun and operatively engaging said shaft and means on the mount directly engaging said rod for utilizing longitudinal movement of the rod to rotate the same and open the breech.

5. The combination with a breech-loading gun, a transverse operating-shaft for the breech mechanism, and a recoil-mount; of a rotatable rod moving with the gun and operatively engaging said shaft, means on the mount directly engaging said rod for utilizing longitudinal movement of the rod to rotate the same and open the breech and automatic means for thereupon releasing said engagement between rod and mount.

6. The combination with a breech-loading gun, a transverse operating-shaft for the breech mechanism, and a recoil-mount; of a longitudinal rotatable rod moving with the gun and operatively engaging said shaft, and means on the mount directly engaging said rod for utilizing longitudinal movement of the rod to rotate the same and open the breech.

7. The combination with a breech-loading gun, a transverse operating-shaft for the breech mechanism, and a recoil-mount; of a longitudinal rotatable rod moving with the gun and operatively engaging said shaft, means on the mount directly engaging said rod for utilizing longitudinal movement of the rod to rotate the same and open the breech and automatic means for thereupon releasing said engagement between rod and mount.

8. The combination with a breech-loading gun, a transverse operating-shaft for the breech mechanism, and a recoil-mount; of a rotatable rod moving with the gun and operatively engaging said shaft, a rotatable member on the mount constantly engaging said rod and means whereby said member is rotated by longitudinal movement of the rod in one direction and locked against rotation during the reverse longitudinal movement of the rod and said rod rotated.

9. The combination with a breech-loading gun, a transverse operating-shaft for the breech mechanism, and a recoil-mount; of a rotatable rod moving with the gun and operatively engaging said shaft, a rotatable member on the mount constantly engaging said rod and means whereby said engagement between rod and member rotates said rod to open the breech during longitudinal movement of the rod.

10. The combination with a breech-loading gun, a transverse operating-shaft for the breech mechanism, and a recoil-mount, of a rotatable rod operatively engaging said shaft, means on the mount directly engaging said rod to rotate same to open the breech and means energized by said rotation of the rod to rotate same to close the breech.

11. The combination with a breech-loading gun, a transverse operating-shaft for the breech mechanism, and a recoil-mount; of a rotatable rod operatively engaging said shaft, means on the mount directly engaging said rod for automatically actuating same to open the breech, means for locking the breech mechanism in open position and means for automatically closing the breech mechanism when released.

12. The combination with a breech-loading gun, a transverse operating-shaft for the breech mechanism, and a recoil-mount; of a rotatable rod operatively engaging said shaft and means on the mount directly engaging said rod whereby said rod is rotated to open the breech after discharge of gun.

13. The combination with a breech-loading gun, a transverse operating-shaft for the breech mechanism, and a recoil-mount; of a longitudinal rotatable rod moving with the gun and operatively connected with said shaft, and means on the mount engaging the rod adapted to rotate said rod during its longitudinal movement in one direction and ineffective to rotate said rod during its longitudinal movement in the reverse direction.

14. The combination with a breech-loading gun and a recoil-mount; of a rotatable rod operatively engaging the breech mechanism and moving with the gun, a rotatable member on the mount engaging guides on said rod and adapted to be rotated by movement imparted to the rod in one direction by the gun after discharge, and means for locking said member against rotation during the reverse movement imparted to the rod whereby said rod is rotated.

15. The combination with a breech-loading gun and a recoil-mount; of a rotatable rod operatively engaging the breech mechanism and moving with the gun, a rotatable member on the mount engaging guides on said rod and adapted to be rotated by movement of the rod in one direction, and means for locking said member against rotation during reverse movement of the rod whereby said rod is rotated.

16. The combination with a breech-loading gun, a transverse operating-shaft for the breech mechanism, and a recoil-mount; of a rotatable rod operatively engaging said shaft and moving with the gun, means for utilizing longitudinal movement of the rod after firing to rotate same to open the breech, a spring for rotating same to close the breech, means for locking said rod against the influence of said spring, and means for automatically releasing said rod to the influence of said spring.

17. The combination with a breech-loading gun and a recoil-mount; of a rotatable rod operatively engaging the breech mechanism and moving with the gun, a bushing journaled in the mount engaging the rod and adapted to be rotated by longitudinal movement of the rod in one direction, and means for locking said bushing against rotation during the reverse longitudinal movement of the rod whereby said rod is rotated.

18. The combination with a breech-loading gun, a recoil-mount, and automatic opening and closing apparatus for the breech mechanism; of a latch normally adapted to automatically engage the breech mechanism to retain same in open position, and means for restraining said latch from engagement with the breech mechanism.

19. The combination with a breech-loading gun, a recoil-mount, and automatic opening and closing apparatus for the breech mechanism; of a latch automatically retaining the breech mechanism in open position and adapted to be tripped by hand in the operation of loading and means for locking the latch in inoperative position.

20. The combination with a breech-loading gun, a recoil-mount, and automatic opening and closing apparatus for the breech mechanism; of a shaft journaled on the gun having a toe at one extremity, a spring rotatively engaging the shaft to deflect the toe into engagement with the breech mechanism when the breech opens and means for releasing the engagement of toe with breech mechanism by hand in the operation of loading.

21. The combination with a breech-loading gun, a recoil-mount, and automatic opening and closing apparatus for the breech mechanism; of a shaft journaled on the gun having a toe at one extremity, a spring rotatively engaging the shaft to deflect the toe to hold the breech mechanism in open position and a tripping-vane at the other extremity of the shaft adapted to be engaged by the hand in the operation of loading to trip the toe and permit the closing of the breech.

22. The combination with a breech-loading gun; of a swinging carrier pivoted to the gun by a hinge-pin, a revoluble breech-block mounted on the carrier, an actuating-bar mounted to slide transversely in the carrier and engaging the breech-block, a lever for swinging said carrier about its pivot, a stud on the lever engaging a slot in the actuating-bar whereby movement of the lever slides the actuating-bar to rotate the breech-block, said slot having its inner end curved about the center of the hinge-pin whereby transmission of motion from the breech-block to the lever is prevented when the block is closed.

23. The combination with a breech-loading gun and a recoil-mount; of a rotatable rod operatively engaging the breech mechanism, means for rotating the rod in one direction to open the breech and a spring energized by said rotation to rotate the rod to close the breech, said spring having one end secured to the rod and the other end to a ratchet-wheel loosely mounted on the rod, a pawl pivoted to the gun adapted to engage said ratchet-wheel to lock same against rotation from the influence of the spring and whereby rotation of the ratchet-wheel against the tendency of the spring adjusts the tension of said spring.

24. The combination with a breech-loading gun and a recoil-mount; of a swinging carrier supporting the breech mechanism and pivoted to the gun by an operating-shaft, a rotatable rod having a gear meshing with a gear carried by the shaft, whereby the breech mechanism is actuated, and means for slidably adjusting the gear on the shaft into and out of mesh with the rod-gear.

25. The combination with a breech-loading gun and a recoil-mount; of a swinging carrier supporting the breech mechanism and pivoted to the gun by an operating-shaft, a sleeve carrying a gear slidable on the shaft, a rotatable rod having a gear adapted to mesh with the shaft-gear whereby the breech mechanism is actuated, and means for adjusting said sleeve on the shaft to bring the gear carried thereby into and out of mesh with the rod-gear.

26. The combination with a breech-loading gun and a recoil-mount; of a swinging carrier supporting the breech mechanism and pivoted to the gun by an operating-shaft, a sleeve carrying a gear slidable on the shaft, a rotatable rod having a gear adapted to mesh with the shaft-gear, whereby the breech mechanism is actuated, an eccentric-shaft journaled in said sleeve and engaging a transverse slot in the operating-shaft and adapted by its rotation to move the gear carried by the sleeve into and out of engagement with the rod-gear.

27. The combination with a breech-loading gun, a mount on which the gun recoils, and automatic opening and closing apparatus for the breech mechanism; of a latch automatically retaining the breech mechanism in open position and means for tripping said latch situated out of the path of travel of the closing breech mechanism and adapted to be actuated by the hand of the loader during its movement after the insertion of the charge.

In testimony whereof I have signed my name to this specification in presence of two witnesses.

VERNON C. TASKER.

Witnesses:
G. T. SYMPSON,
A. A. LEECH, Jr.